R. T. HALLIDAY.
LAWN MOWER.
APPLICATION FILED APR. 16, 1920.

1,379,559.

Patented May 24, 1921.

Inventor
Robert Tinning Halliday
By B. Singer, Atty.

UNITED STATES PATENT OFFICE.

ROBERT TINNING HALLIDAY, OF CROSS, BLACKWOOD, SCOTLAND.

LAWN-MOWER.

1,379,559.   Specification of Letters Patent.   Patented May 24, 1921.

Application filed April 16, 1920. Serial No. 374,340.

*To all whom it may concern:*

Be it known that I, ROBERT TINNING HALLIDAY, of Cross, Blackwood, Kirkmuirhill, Scotland, grocer and hardware merchant and green-keeper of Blackwood Bowling Club, have invented certain new and useful Improvements in and Connected with Lawn-Mowers, of which the following is a specification.

My invention relates to improvements in and connected with lawn-mowers, and has for its object to provide a means by which a much shorter cut of the grass will be secured than hitherto thereby obviating the necessity of mowing the grass so frequently as at present, and thus increasing the life of the lawn-mower, and in the case of bowling greens, a much keener green will be the result. The invention is also useful for leveling purposes when sand is spread on the ground at end of season.

In carrying out my invention, I provide a bar of steel, malleable cast iron, or other suitable metal of any convenient thickness and breadth and provided with serrations or saw-cuts along the whole length of the bottom or lower edge and having upwardly projecting arms. This appliance is suitably, adjustably and detachably connected to the fore-part of the mower immediately in front of the cutting knives.

In order that my invention may be properly understood and readily carried into effect, I have hereunto appended one sheet of drawings, of which—

Figure 1:
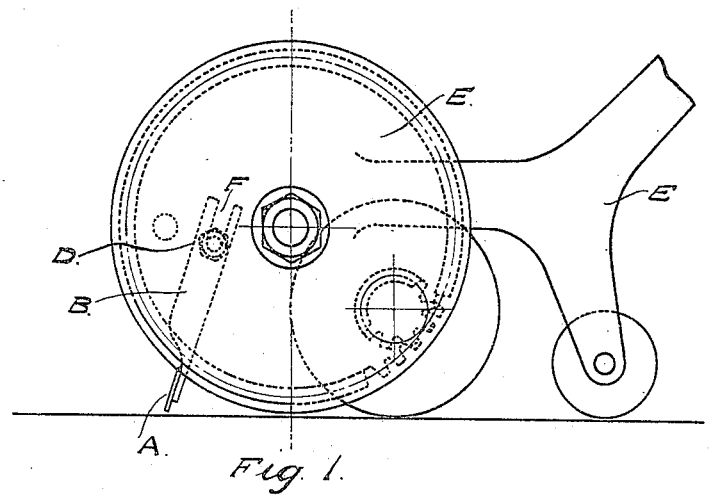
Figure 1 is a side view of part of a lawn-mower illustrating my invention.
Figure 2:
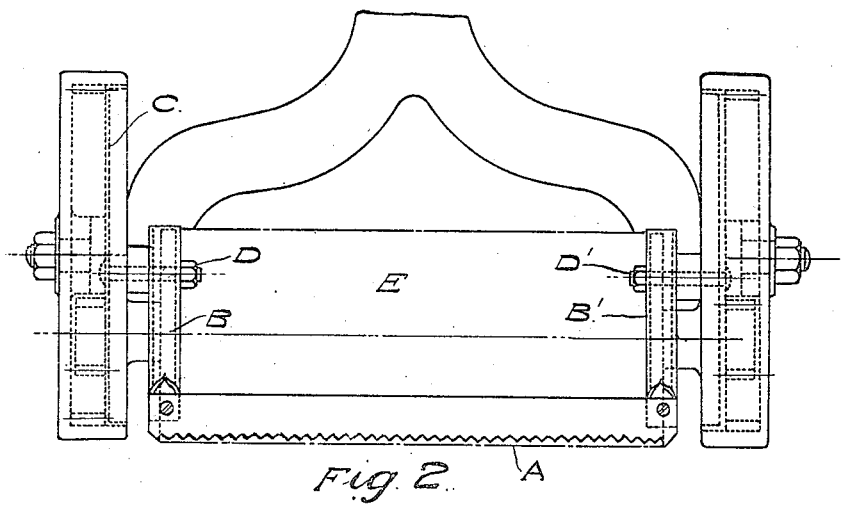
Fig. 2 is a front view.

Referring to the drawings, A is the serrated or saw-cut bar and B, B$^1$ are the upwardly projecting arms which are fixed to the plate C forming part of the mower E by means of bolts D, D$^1$. The arms B and B$^1$ are forked as shown at F to enable the serrated bar to be raised or lowered as desired.

When in use, the serrated or saw-cut edges of the appliance which travel close on the turf, raises the grass on end so that, as the knives or cutters which immediately follow, come into contact with the grass, a much shorter cut is obtained.

Claim:

In combination with a lawn mower, a bar extending across the front of the mower, said bar being rearwardly and upwardly inclined, being provided with serrations on its lower edge, and being also provided at its ends with upwardly extending arms, said arms being vertically adjustably secured to the mower.

In testimony whereof I affix my signature in presence of two witnesses.

ROBERT TINNING HALLIDAY.

Witnesses:
 CHAS. LIDDLE,
 JOHN TRAIN LIDDLE.